US00RE43405E

(19) United States
(12) Reissued Patent
Kato

(10) Patent Number: US RE43,405 E
(45) Date of Reissued Patent: May 22, 2012

(54) METHOD OF DISPLAYING MEASUREMENT RESULT IN INSPECTION PROCESS AND SYSTEM THEREOF, AND COMPUTER PROGRAM

(75) Inventor: Kazufumi Kato, Sakata (JP)

(73) Assignee: Seiko Epson Corporation, Tokyo (JP)

(21) Appl. No.: 12/018,757

(22) Filed: Jan. 23, 2008

Related U.S. Patent Documents

Reissue of:
(64) Patent No.: 6,990,421
Issued: Jan. 24, 2006
Appl. No.: 10/677,755
Filed: Oct. 1, 2003

(30) Foreign Application Priority Data

Oct. 2, 2002 (JP) ..... 2002-290009

(51) Int. Cl.
*G01N 37/00* (2006.01)

(52) U.S. Cl. ..... 702/81; 702/35; 702/84; 702/97

(58) Field of Classification Search ..... 324/751, 324/760; 356/237.4, 394; 382/141, 145, 382/149; 438/14, 16, 17; 700/103, 108, 700/109, 110, 121; 702/35, 81, 84, 97
See application file for complete search history.

(56) References Cited

U.S. PATENT DOCUMENTS

| | | | |
|---|---|---|---|
| 5,801,965 | A | 9/1998 | Takagi et al. |
| 5,841,893 | A | 11/1998 | Ishikawa et al. |
| 6,185,322 | B1 | 2/2001 | Ishikawa et al. |
| 6,185,324 | B1 | 2/2001 | Ishihara et al. |
| 6,330,352 | B1 | 12/2001 | Ishikawa et al. |
| 6,339,653 | B1 | 1/2002 | Ishikawa et al. |
| 6,438,438 | B1 | 8/2002 | Takagi et al. |
| 6,449,585 | B1 | 9/2002 | Hyun et al. |
| 6,456,951 | B1 | 9/2002 | Maeda et al. |
| 6,529,619 | B2 | 3/2003 | Ishikawa et al. |
| 6,542,830 | B1 | 4/2003 | Mizuno et al. |
| 6,546,308 | B2 | 4/2003 | Takagi et al. |
| 6,628,817 | B2 | 9/2003 | Ishikawa et al. |
| 6,638,779 | B2 | 10/2003 | Taira |
| 6,757,621 | B2 | 6/2004 | Mizuno et al. |
| 6,974,710 | B2 | 12/2005 | Taira |

(Continued)

FOREIGN PATENT DOCUMENTS

| | | |
|---|---|---|
| JP | 05-074899 | 3/1993 |

(Continued)

*Primary Examiner* — Drew A Dunn
*Assistant Examiner* — Stephen Cherry
(74) *Attorney, Agent, or Firm* — DLA Piper LLP (US)

(57) ABSTRACT

A method of displaying a measurement result in an inspection process using network, the method includes a first step that a host, which intensively controls and manages a device for inspecting a lot to be processed in one or a plurality of steps, transmits to the device a condition of measuring a lot determined to be put in, a second step that the device measures the lot based on the measurement condition received via the network and then obtains measured data, a third step that the host determines whether the measured data received via the network is abnormal or normal based on a predetermined assessment standard and then produces a result of assessing a measured value so as to transmit the result to the device and a fourth step that the device provides a display corresponding to the result of assessing the measured value in accordance with the received result of assessing the measured value as well as a previously registered display standard.

12 Claims, 6 Drawing Sheets

U.S. PATENT DOCUMENTS

| | | | |
|---|---|---|---|
| 2001/0001015 | A1 | 5/2001 | Ishikawa et al. |
| 2001/0020194 | A1 | 9/2001 | Takagi et al. |
| 2001/0038708 | A1 | 11/2001 | Ishikawa et al. |
| 2002/0034326 | A1 | 3/2002 | Ishikawa et al. |
| 2002/0132381 | A1 | 9/2002 | Taira |
| 2003/0130806 | A1 | 7/2003 | Mizuno et al. |
| 2004/0092049 | A1 | 5/2004 | Taira |

FOREIGN PATENT DOCUMENTS

| | | |
|---|---|---|
| JP | 05-074900 | 3/1993 |
| JP | 2002100547 A | 4/2002 |

Status of a product under control by a host implemented to enable flow of product

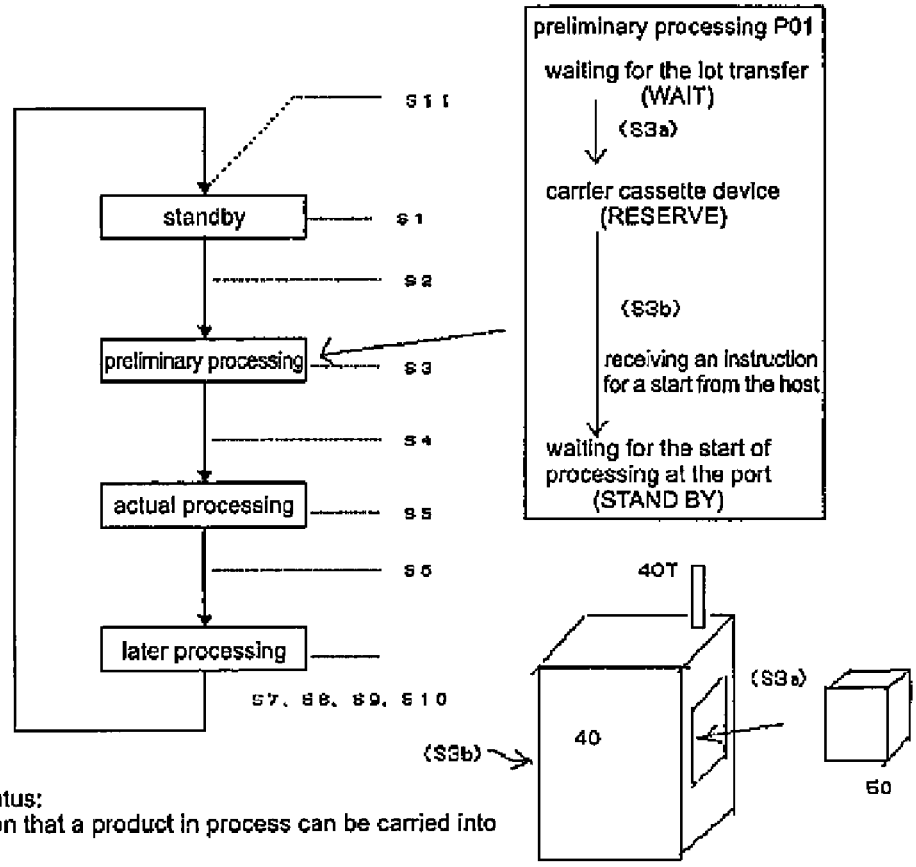

standby status:
a condition that a product in process can be carried into a device preliminary processing status:
a condition that the device reserves processing of the product in process actual processing status:
a condition that the product in process is actually being processed later processing status:
a condition that processing the product in process is terminated and then it is being waited the host's determining whether the processing has been normally conducted

FIG. 3

| D1 | D2 | D3 | D4 |
|---|---|---|---|
| No | sequence | message | signal tower |
| 1 | S 2 | Cassette ID XXXXXX Reservation is canceled | flashing |
| 2 | S 4 | Cassette ID XXXXXX Start command can't be accepted | flashing |
| 3 | S 1 0 | Cassette ID XXXXXX Out of range ( Thickness /Particle/ Defect ) | flashing |
| 4 | S 1 1 | Cassette ID XXXXXX Result of inspection is good | lighting |

FIG. 5

METHOD OF DISPLAYING MEASUREMENT RESULT IN INSPECTION PROCESS AND SYSTEM THEREOF, AND COMPUTER PROGRAM

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,990,421. The reissue applications are this application (U.S. application Ser. No. 12/018,757), filed on Jan. 23, 2008, which is a reissue of U.S. Pat. No. 6,990,421, and U.S. application Ser. No. 12/959,289, filed on Dec. 2, 2010, which is a divisional reissue of U.S. Pat. No. 6,990,421.*

BACKGROUND OF THE INVENTION

1. Field of the Invention

The present invention relates to a method of checking a result of a measurement and more particularly to a method of displaying a measurement result in an inspection process using a network and a system thereof and further to a computer program.

2. Description of Related Art

Conventionally, one host terminal is installed for one measuring device in an operational environment in an inspection process in a factory for manufacturing things such as semiconductors. Also, regarding the measuring device, there are measuring devices equipped with signal towers and with terminals in a mixed manner in the environment. Moreover, since data standards in respective processes are different, the host assesses measured data for validation thereof. In order for an operator to determine whether it is possible to bring (hand over) a(n) (intermediate) product to a next step, the host terminal recognizes a corresponding measurement result by using an application of a process management system and determines whether a lot can be brought over to a next step.

FIG. 6 is a drawing showing a flow of operational procedures in a conventional inspection process.

A process management server 1) determines the input of a targeted lot from a host terminal. Then, a device control server 2) makes a reservation with a device. The device 3) accepts the reservation for the measurement. The device control server 4) instructs conditions and a start of measurement. The device then 5) starts measurement and 6) advises measured data. The device control server 7) obtains the measured data. The process management server 8) assesses the measured data, and the host terminal confirms the measurement result. When the measurement result is acceptable, the lot is carried to a next step. When the measurement result is not acceptable, bringing the lot to the next step is suspended.

In some cases, an appearance inspection is performed with respect to a lot by each category based on a result of measuring electrical characteristics. The content of the lot is classified based on the result of measuring the electrical characteristics and the appearance inspection so as to be accommodated in an accommodating magazine. In other cases, the content of a lot is sealed and shaped according to categories based on a result of measuring electrical characteristics.

However, technologies of the prior art have the following problems. When measurement of a product is completed, a measuring device equipped with a signal tower can be checked. However, it is not possible to instantly perform validation of the measured result by referring to the appearance. Also, when an inspector of an inspection process is in charge of a plurality of devices and gets stuck with a device that takes a few minutes to measure one lot, the inspector may be away from other measuring devices. Moreover, an operator has to take an action (required processing) after a host terminal confirms whether it has checked if the measurement-completed lot satisfies the quality standard; whether the lot should be brought over to the next step; and whether the lot should be reported to an engineer.

The present invention has been achieved in light of the above problems and intends to provide a method of displaying a measurement result in an inspection process. The method allows a host via a network to assess a result of inspecting a lot and then has an inspection device display the result. The method also enables an interlock to the next step, and a system thereof as well as a computer program.

SUMMARY OF THE INVENTION

An embodiment of the present invention resides in a method of displaying a measurement result in an inspection process using a network. The method includes a first step that a host, which intensively controls and manages a device for inspecting a lot to be processed in one or a plurality of processes, transmits to the device a condition of measuring a lot determined to be put in. The method includes a second step that the device measures the lot based on the measurement condition received via the network and then obtains measured data. The method includes a third step that the host determines whether the measured data received via the network is abnormal or normal based on a predetermined assessment standard and then produces a result of assessing a measured value so as to transmit the result to the device. The method includes a fourth step that the device provides a display corresponding to the result of assessing the measured value in accordance with the received result of assessing the measured value as well as a previously registered display standard.

An embodiment of the present invention resides in the method of displaying a measurement result in an inspection process, wherein the third step includes a step that when the result of assessing the measured value is abnormal, a host terminal connected to the host displays that the lot is abnormal, and when the result of assessing the measured value is normal, the host terminal displays that the lot starts into a next process.

An embodiment of the present invention resides in the method of displaying a measurement result in an inspection process, wherein the fourth step includes a fifth step of providing a display corresponding to the result of assessing the measured value and a display of an operating condition showing the device being operating or not operating, by lighting up, turning off, or flashing four colors of a four color display unit connected to the device, the unit including a first display portion, a second display portion, a third display portion and a fourth display portion of colors different from each other.

An embodiment of the present invention resides in the method of displaying a measurement result in an inspection process, wherein the fourth step includes a step of providing a display showing the operating condition of the device and a display corresponding to the result of assessing the measured value on a device monitor connected to the device.

An embodiment of the present invention resides in the method of displaying a measurement result in an inspection process, wherein the third step includes a step of not transmitting an instruction to transfer a corresponding lot or of transmitting an instruction to transfer the lot to a buffer, to a transferring portion connected to the host via the network in case that the result of assessing the measured value is abnormal while transmitting to the transferring portion an instruction to transfer the corresponding lot and also transmitting to a processing device for a next process an instruction to start processing of the corresponding lot in case that the result of assessing the measured value is normal.

An embodiment of the present invention resides in the method of displaying a measurement result in an inspection process, wherein the second step includes a step of reading a lot number such as a bar code by means of an identification means mounted in the device and then adding the lot number to the measured data so as to transmit the data to the host, and wherein the third step includes a step of including the lot number in the produced result of assessing the measured value.

An embodiment of the present invention resides in a computer program capable of implementing an operation by the method of displaying a measurement result in an inspection process, wherein each step in the method of displaying a measurement result in an inspection process is encoded.

An embodiment of the present invention resides in a system of displaying a measurement result in an inspection process using a network. The system includes a device that measures a lot based on a measurement condition corresponding to the inspection process so as to obtain measured data; and a host that intensively controls and manages the device in one or a plurality of processes. The host further includes a device control server that transmits to the device via the network the measurement condition of a lot determined to be put in; and a processes management server that assesses the measured data, which is received via the network, based on a predetermined assessment standard, and then produces a result of assessing a measured value so as to transmit the result to the device. The device provides a display corresponding to the result of assessing the measured value in accordance with the received result of assessing the measured value and a previously registered display standard.

An embodiment of the present invention resides in the system of displaying a measurement result in an inspection process, wherein the host includes a host terminal connected to the network, and the host terminal displays that the lot is abnormal when the result of assessing the measured value is abnormal while displaying that the lot starts into a next process when the result of assessing the measured value is normal.

An embodiment of the present invention resides in the system of displaying a measurement result in an inspection process, wherein the device includes a four color display unit including a first display portion, a second display portion, a third display portion and a fourth display portion of colors different from each other. The four color display unit provides a display corresponding to the result of assessing the measured value and a display showing an operating condition of the device operating or not operating, by lighting up, turning off or flashing four colors of the four color display unit.

An embodiment of the present invention resides in the system of displaying a measurement result in an inspection process, wherein the device includes a device monitor, and the device monitor provides the display showing the operating condition of the device and the display corresponding to the result of assessing the measured value.

An embodiment of the present invention resides in the system of displaying a measurement result in an inspection process, wherein the host does not transmit an instruction to transfer the corresponding lot or transmits an instruction to transfer the lot to a buffer, to a transferring portion connected to the host via the network in case that the result of assessing the measured value is abnormal while transmitting to the transferring portion an instruction to transfer the corresponding lot and also transmitting to a processing device for a next process an instruction to start processing of the corresponding lot in case that the result of assessing the measured value is normal.

An embodiment of the present invention resides in the system of displaying a measurement result in an inspection process, wherein the device includes an identification means for reading a lot number such as a bar code, wherein the identification means reads the lot number and then adds the number to the measured data so as to transmit the data to the host, and wherein the processes management server includes the lot number in the produced result of assessing the measured value.

An embodiment of the present invention resides in a lot processing system using the system of displaying a measurement result in an inspection process., The system includes a host that controls and manages a device for inspecting a lot in each of a plurality of processes, wherein the host does not transmit an instruction to transfer a corresponding lot or transmits an instruction to transfer the lot to a buffer, to a transferring portion connected to the host via network in case that a result of assessing a measured value of the lot is abnormal while transmitting to the transferring portion an instruction to transfer the corresponding lot and also transmitting to a processing device for a next process an instruction to start processing of the corresponding lot in case that the result of assessing the measured value is normal.

An embodiment of the present invention resides in a host server for use in an inspection process using a network. The host server includes a device control server that controls a device of the inspection process in one or a plurality of processes via the network and transmits to the device a condition of measuring a lot determined to be put in and a processes management server that intensively manages the device, assesses measured data, which is received via the network, based on a predetermined assessment standard, and then produces a result of assessing a measured value so as to transmit the result to the device.

An embodiment of the present invention resides in the host server, wherein the processes management server does not transmit an instruction to transfer a corresponding lot or transmits an instruction to transfer the lot to a buffer, to a transferring portion connected to the host via the network in case that the result of assessing the measured value is abnormal while transmitting to the transferring portion an instruction to transfer the corresponding lot and also transmitting to a processing device for a next step an instruction to start processing of the corresponding lot in case that the result of assessing the measured value is normal.

An embodiment of the present invention resides in a device for implementing an inspection in an inspection process using a network. The device includes a four color display unit including a first display portion, a second display portion, a third display portion and a fourth display portion of colors different from each other; and a main unit, incorporated in the device, that transmits to a host server via the network measured data obtained by measuring a lot based on a measurement condition corresponding to the inspection process. The four color display unit provides a display corresponding to a result of assessing a measured value and a display showing an operating condition of the main unit of the device operating or not operating by lighting up, turning off or flashing the four colors in accordance with the result of assessing the measured value received by the main unit of the device from the host server via the network and a previously registered display standard.

An embodiment of the present invention resides in the device, further including a device monitor that provides the display showing the operating condition of the main unit of the device and the display corresponding to the result of assessing the measured value.

An embodiment of the present invention resides in the device, further including an identification means for reading a lot number such as a bar code and then adding the number to the measured data so as to transmit the data to the host server, wherein the device monitor displays the lot number included in the result of assessing the measured value transmitted from the host server.

BRIEF DESCRIPTION OF THE DRAWINGS

FIG. 3 is a drawing showing a state of operation in each step in FIG. 2.

FIG. 5 is a drawing showing an example of the correspondence between messages shown by a device monitor connected to a host terminal and a device in FIG. 1 and the signal tower.

DETAILED DESCRIPTION OF THE PREFERRED EMBODIMENTS

Figure 1:
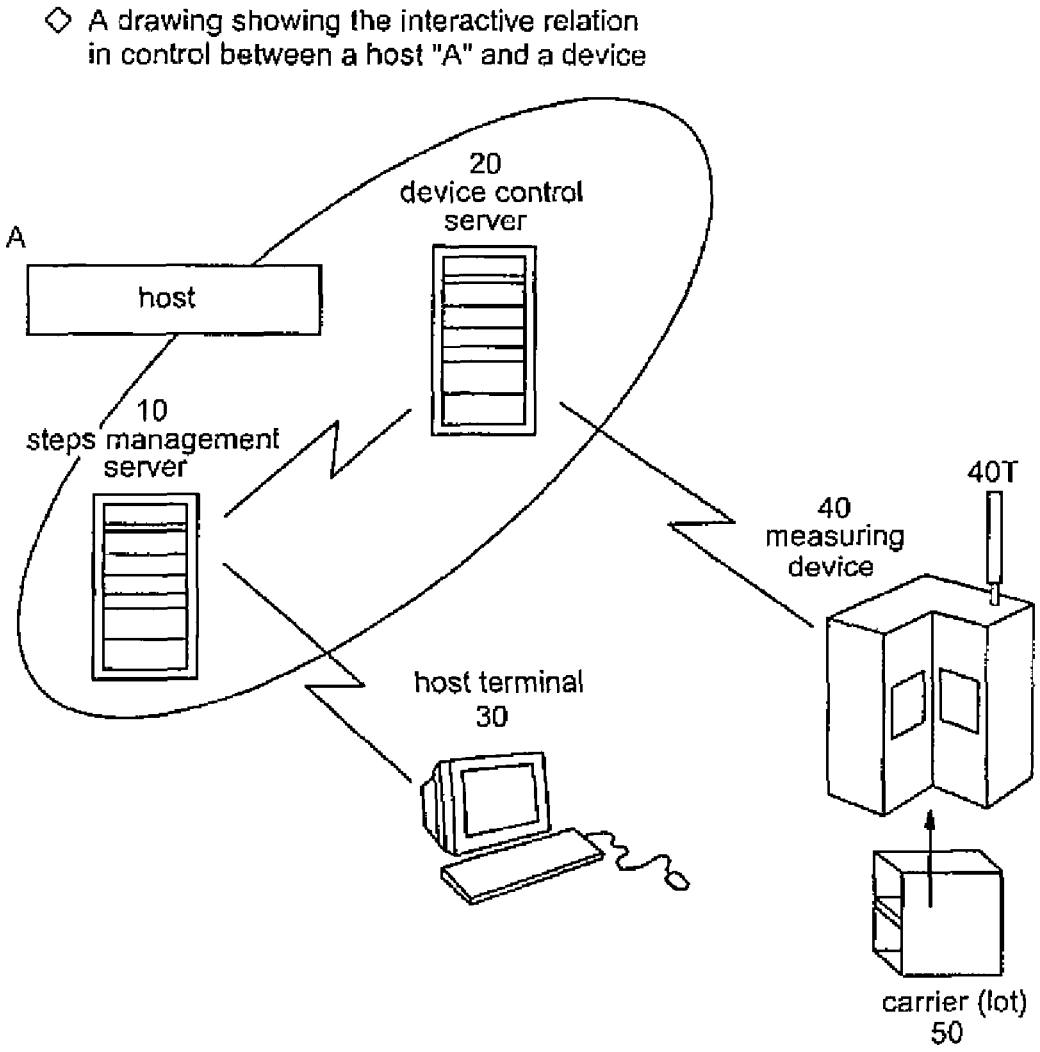
FIG. 1 is a drawing showing a schematic structure of a system of displaying a measurement result in an inspection process according to an embodiment of the invention.

An embodiment of the invention is explained in detail below with reference to drawings. FIG. 1 illustrates a schematic structure of a system of displaying a measurement result in an inspection process according to this embodiment.

As shown in FIG. 1, the system of displaying a measurement result in the inspection process according to this embodiment includes a host (host server) "A" including a process management server 10 and a device control server 20, a host terminal 30 and a device (measuring device) 40 including a signal tower (four (4)-lamp light and four color display unit) 40T. The device (main unit of the device) 40 measures each lot (carrier) 50.

The host "A" stores a host management table including a machine type of the device 40, step numbers, items for inspection (the thickness and the width, for example) and subjects of inspection (the film thickness and the line width, for example); a process flow (a flow sheet); and a lot progress/processing log. Moreover, the host "A" determines the input of a targeted lot from the host terminal 30, reserves a processing port and then instructs conditions of measurement. As the measurement conditions, parameters (measurement conditions) such as a processing recipe, the number of points of measurement and the location of a wafer within a carrier to be measured are set. Furthermore, the host "A" obtains measured data from the device 40, assesses the measured data and then transmits a result of assessing a measured value.

Moreover, the device 40 includes a device monitor (not shown in the drawing) for displaying information such as an abnormal lot number.

Next, a method using the system of displaying a measurement result in an inspection process is explained.

Figure 2:
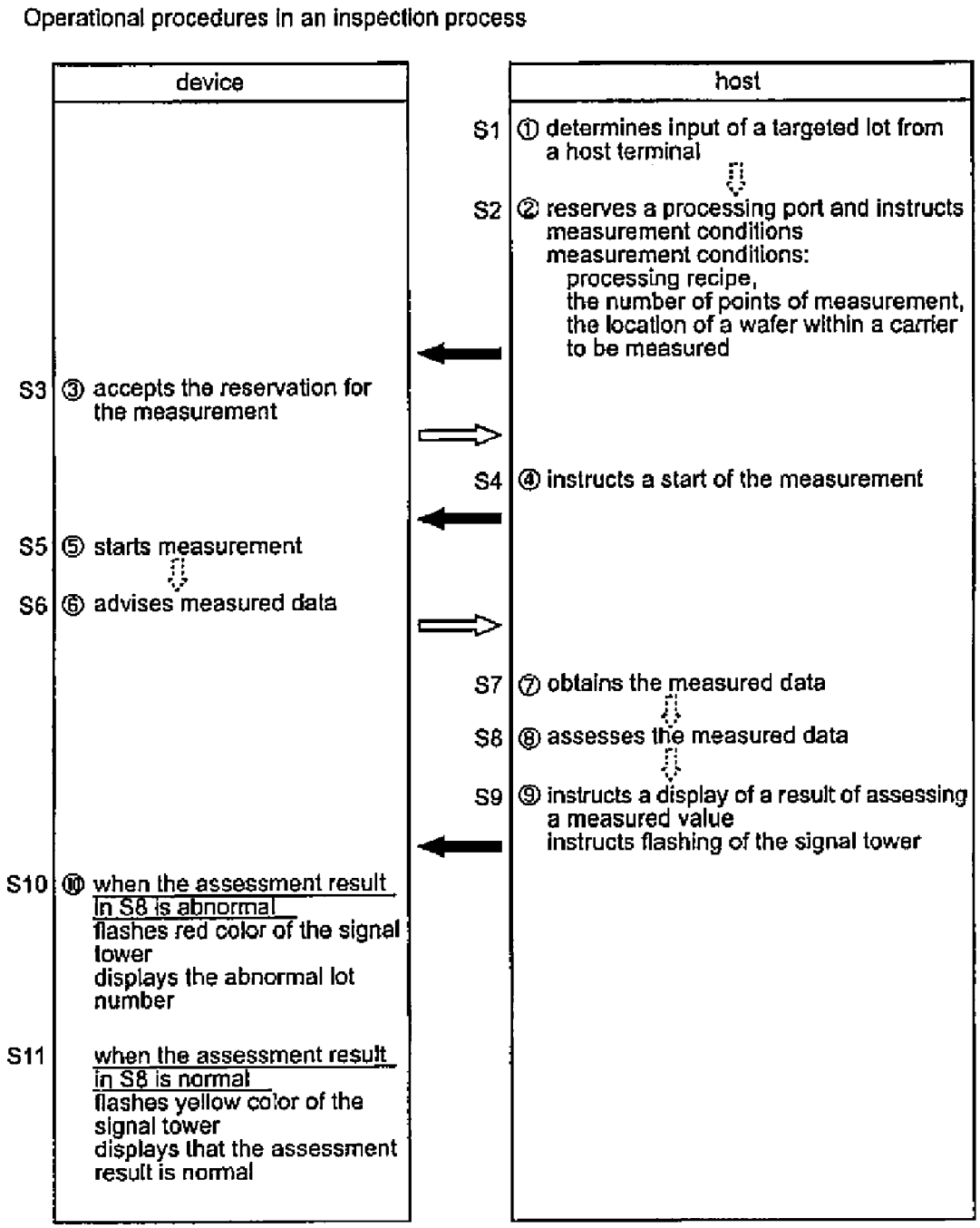
FIG. 2 is a drawing showing the flow of the operation by a method of displaying a measurement result in an inspection process according to the embodiment of the invention.

FIG. 2 is a drawing showing a flow of operation by a method for displaying a measurement result in an inspection process according to this embodiment.

The host "A" determines an input of a targeted lot from the host terminal 30 (step S1).

The host "A" reserves a processing port and instructs measurement conditions (step S2). As the measurement conditions, parameters (measurement conditions) such as a processing recipe, the number of points of measurement and the location of a wafer within a carrier to be measured are set.

The device 40 accepts the reservation for the measurement (step S3).

The host "A" instructs a start of the measurement (step S4).

The device 40 starts measurement (step S5) and advises the host "A" of measured data (step S6).

The host "A" obtains the measured data (step S7), assesses the measured data (step S8) and then transmits a result of assessing a measured value (an instruction for displaying the result of assessing the measured value) (step S9).

When the result of assessing the measured value is abnormal (when the assessment result is abnormal in step S8), the device flashes a red light of the signal tower or has the device monitor to display the abnormal lot number (step S10).

When the result of assessing the measured value is normal (when the assessment result is normal in step S8), the device flashes a yellow light and shows that the measurement result is normal (step S11).

FIG. 3 is a drawing showing the state of operation in each step shown in FIG. 2.

As shown in FIG. 3, step S1 implements 'a standby (to wait for a lot to be carried in when a port is available)', and step S3 implements 'a preliminary processing.' As shown in this preliminary processing P01, operation shifts in the order of waiting for the lot transfer (WAIT) (step S3a), a carrier cassette device (RESERVE), receiving an instruction for a start from the host "A" (step S3b) and waiting for the start of processing at the port (STANDBY). Step S5 implements 'an actual processing (to implement an inspection in accordance with the instruction by the host "A" in step S2).'

Steps S7 to S10 serve as 'a later processing.' Specifically, the host "A" obtains measured data (step S7), assesses the measured data (step S8) and then transmits a result of assessing a measured value (instruction for displaying the result of assessing the measured value) (step S9). When the result of assessing the measured value is abnormal (when the assessment result is abnormal in step S8), the device flashes the red light of the signal tower or has the device monitor to display the abnormal lot number (step S10).

Step S2, step S4 and step S6 each display 'transmitting and receiving' status between the host "A" and the device 40. More specifically, the host "A" executes step S2: reserving the processing port and instructing the measurement conditions, and step S4: instructing the start of measurement. The device 40 executes step S6: advising the host "A" of the measured data.

Figure 4:
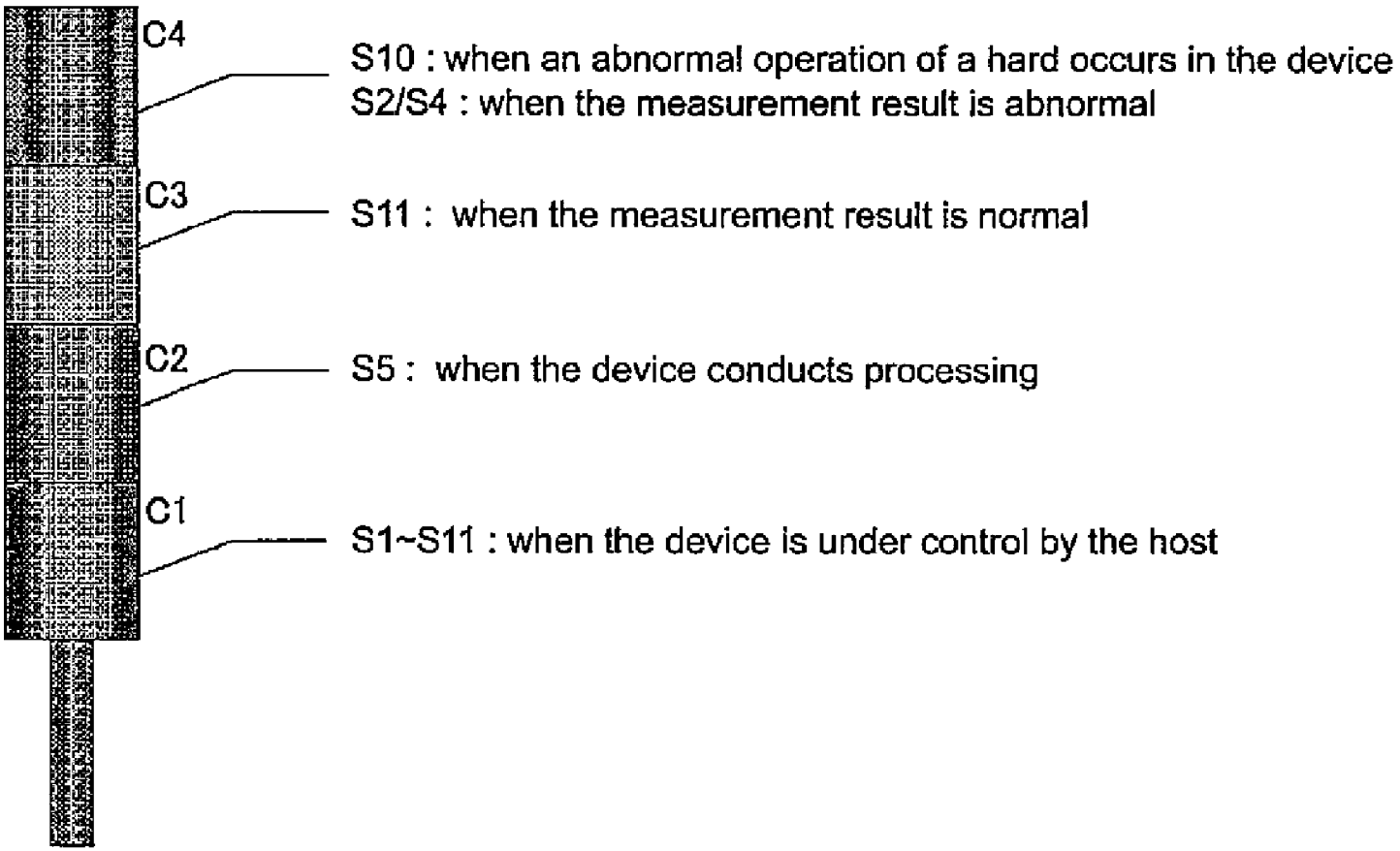
FIG. 4 is a drawing showing the relationship between displays by a signal tower in FIG. 1 and steps in FIG. 2.
Figure 6:
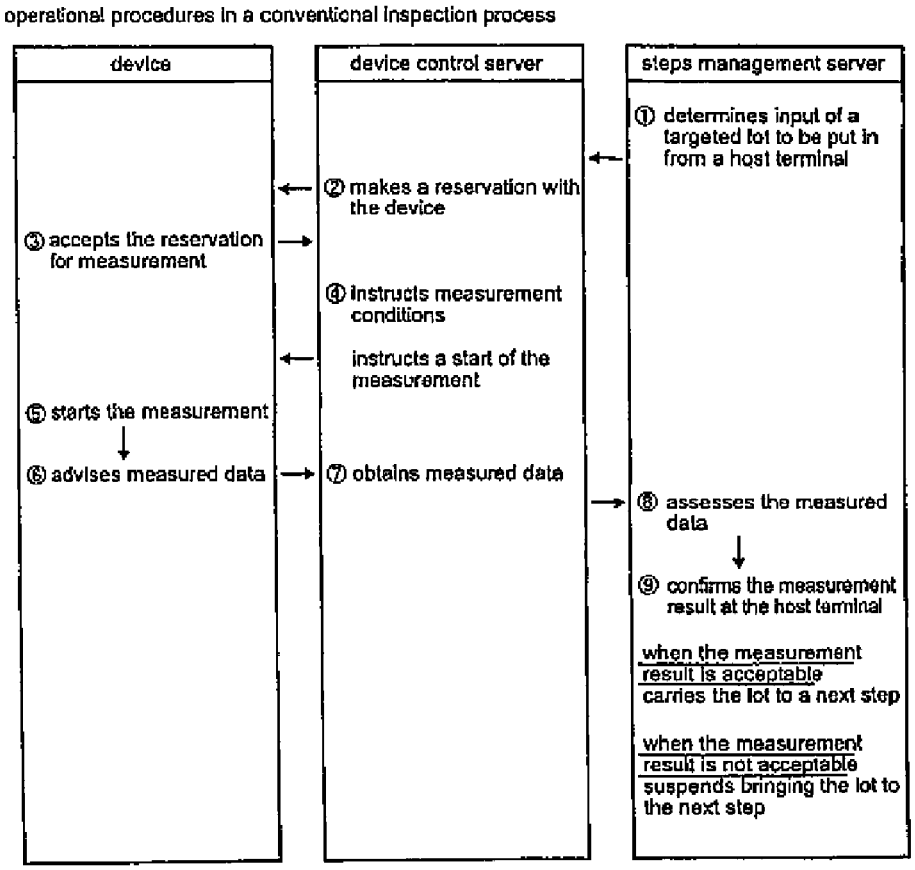
FIG. 6 Prior Art
FIG. 6 is a drawing showing the flow of operational procedures in an inspection process of the prior art.

FIG. 4 is a drawing showing the relationship between displays of the signal tower 40T shown in FIG. 1 and the steps shown in FIG. 2.

The signal tower 40T is a four (4)-lamp light 40T including a blue color display portion (a first display portion) C1, a green color display portion (a second display portion) C2, a yellow color display portion (a third display portion) C3 and a red color display portion (a fourth display portion) C4.

In step S1 through step S11, the blue color display portion C1 is lighted when the device 40 is under control of the host "A", which means that on-line processing is executable. Moreover, when the blue color display portion C1 is "off", it indicatesthat manual measurements are executable.

In step S5, the green color display portion C2 is lighted when the device 40 executes processing, which means that measurements are being conducted. Moreover, when the green color display portion C2 is "off", it indicates that the device 40 is not operating.

In step S11, the yellow color display portion C3 flashes when the measurement result in step S8 is normal. This means a normal state assuring that the measurement processing is completed normally and all the measured data falls within the range of a standard quality. Moreover, on the other hand, the device monitor displays an abnormal lot number when an abnormal operation occurs and also the operating condition of the device 40 such as being measuring or not operating.

In step S10, when an abnormal operation occurs in the device 40, or when the measured result is abnormal as a result of reserving the processing port and instructing the measurement conditions in step S2 and also as a result of instructing the start of measurement in step S4, the red color display portion C4 flashes.

As described above, using the first display portion C1 through the fourth display portion C4 of the four (4)-lamp light 40T enables a display showing an operating condition of the device 40 operating or not operating and also a display showing that the result of assessing the measured value of the lot 50 is normal or abnormal.

FIG. 5 is a drawing showing an example of correspondence between the signal tower 40T and messages shown by the device monitor connected to the host terminal 30 and the device 40 shown in FIG. 1.

FIG. 5 shows a message number D1, a step number (sequence) D2, a message D3 and a signal tower display D4.

'S2' in the sequence D2 shows a result of step S2, which specifically corresponds to any one of the following occasions:

when the main unit of the device 40 does not have a recipe matching the recipe information designated by the host;

when a designated device port is not in an usable condition;

when the designated device port already receives an instruction for another lot 50;

when inadequacy is found with the recipe information (points of measurement, the number of points of measurement etc.) designated by the host "A";

when another lot 50 is already processed at the designated device port; and when the device 40 terminates processing and is then waiting for the processed lot 50 to be transferred from the port. The signal tower display D4 corresponds to flashing of the red color display portion C4 shown in FIG. 4.

'S4' in the sequence D2 shows a result of step S4, which specifically corresponds to any one of the following occasions:

when the device 40 is not in a state capable of executing processing;

when the designated device port has not received a reservation for the lot 50 (regardless of the presence of the lot 50);

when another lot 50 is already processed at the designated device port; and when the device 40 terminates processing and is then waiting for the processed lot 50 to be transferred from the port. The signal tower display D4 corresponds to flashing of the red color display portion C4 shown in FIG. 4.

'S10' in the sequence D2 corresponds to step S10, specifically corresponding to a case that even one bit of data of the measured data falls outside of the range of the product quality standard established inside a company. The signal tower display D4 corresponds to flashing of the red color display portion C4 shown in FIG. 4.

'S11' in the sequence D2 corresponds to step S11, specifically corresponding to a case that all the measured data falls within the range of the product quality standard established inside a company. The signal tower display D4 corresponds to flashing of the blue color display portion C1 and that of the green color display portion C2 shown in FIG. 4. Moreover, the yellow color display portion C3 also flashes (not shown in the drawing).

Furthermore, when the result of assessing the measured value is abnormal, the host "A" does not transmit an instruction to transfer the corresponding lot 50 or transmits an instruction to transfer the lot to a buffer as its destination, to a transferring portion (not shown in the figure) connected to the host "A". When the result of assessing the measured value is normal, the host "A" transmits to the transferring portion an instruction to start transfer of the corresponding lot 50 and also transmits to a processing device for the next step an instruction to start processing of the lot 50. The above instruction for the transfer enables an abnormal lot to be promptly processed.

Moreover, by incorporating an identification means (not shown in the drawing) for reading a lot number such as a bar code and RFID, the device 40 can read a lot number, add it to measured data and then send it to the host "A". Then, by adding the lot number to a result of assessing a measured value, the host "A" can easily confirm that the lot 50 is to be normal or abnormal.

In addition, the invention is not limited to this embodiment and is applicable to a method of displaying a measurement result in an inspection process appropriate in applying this invention, a system thereof and a computer program.

Moreover, the number, location and shape of each of the above structural members is not limited to the ones defined in the above embodiment and can be any number, location and shape appropriate in implementing the invention.

Furthermore, in the drawings, the same structural elements are denoted with the same reference numerals.

Configured as above, the invention exhibits the following advantages.

In an inspection process relying on work by an operator, it no longer happens that a lot is left and remains in a port of a device and an operator waits for the next measurement.

An operator can promptly take the next action on a measured lot, such as bringing the lot to the next step or informing a relevant department of the occurrence of an abnormal condition. Consequently, it is possible to restrain slowdown in processing a lot attributable to human-caused factor that arises in the flow of operation for a lot in an inspection process.

When the invention is adaptable to a standard set by an organization in the semiconductor industry such as the Semiconductor Equipment and Materials International (SEMI), a part of the process is operated by an on-line network, facilitating such processes thereby to be entrusted to an outside company.

No special pass/fail flags are necessary by managing an inspection device with a host. Moreover, it does not happen that an NG lot is transferred to the next step (could be transferred but not processed). Relying on information of a signal tower, an operator of the device can easily recognize and grasp acceptability of a lot, thereby processing a targeted lot.

What is claimed is:

1. A method of displaying a measurement result in an inspection process using a network, the method comprising:

transmitting to a device a measurement condition of a lot determined to be used;

measuring the lot based on the measurement condition received via a network and obtaining measured data;

determining whether or not the measured data received via the network is abnormal or normal based on a predetermined assessment standard and producing a result of assessing a measured value so as to transmit the result to the device; and providing a display corresponding to the result of assessing the measured value in accordance with the received result of assessing the measured value as well as a previously registered display standard, wherein the determining step includes displaying that the lot is abnormal, when the result of asserting the measured value is abnormal and displaying that the lot starts into a next process when the result of assessing the measured value is normal.

2. The method of displaying a measurement result in an inspection process according to claim 1, wherein the providing step includes providing a display showing the operating condition of the device and a display corresponding to the result of assessing the measured value on a device monitor connected to the device.

3. The method of displaying a measurement result in an inspection process according to claim 1, wherein the determining step includes not transmitting an instruction to transfer a corresponding lot or of transmitting an instruction to transfer the lot to a buffer, to a transferring portion connected to a host via the network in case that the result of assessing the measured value is abnormal while transmitting to the transferring portion an instruction to transfer the corresponding lot and also transmitting to a processing device for a next process an instruction to start processing of the corresponding lot in case that the result of assessing the measured value is normal.

4. The method of displaying a measurement result in an inspection process according to claim 1, wherein the measuring step includes reading a lot number including a bar code by an identification mounted in the device and then adding the lot number to the measured data so as to transmit the data to a host, and wherein the determining step includes including the lot number in the produced result of assessing the measured value.

5. A computer program *embodied in a non-transitory computer-readable medium* capable of implementing operation by the method of displaying a measurement result in an inspection process according to claim 1, further comprising encoding each step.

6. A method of displaying a measurement result in an inspection process using a network, the method comprising:

transmitting to a device a measurement condition of a lot determined to be used;

measuring the lot based on the measurement condition received via a network and obtaining measured data;

determining whether or not the measured data received via the network is abnormal or normal based on a predetermined assessment standard and producing a result of assessing a measured value so as to transmit the result to the device; and providing a display corresponding to the result of assessing the measured value in accordance with the received result of assessing the measured value as well as a previously registered display standard, wherein the providing step includes providing a display corresponding to the result of assessing the measured value and a display of an operating condition showing the device operating or not operating, by lighting up, turning off, or flashing four colors of a four color display unit, connected to the device, the unit, including a first display portion, a second display portion, a third display portion and a fourth display portion of colors different from each other.

7. A system of displaying a measurement result in an inspection process using a network, the system comprising:

a device that measures a lot based on a measurement condition corresponding to the inspection process so as to obtain measured data; and a host that intensively controls and manages the device in one or a plurality of steps, the host further comprising:

a device control server that transmits to the device via the network the measurement condition of a lot determined to be used; and a process management server that assesses the measured data, which is received via the network, based on a predetermined assessment standard, and then produces a result of assessing a measured value so as to transmit the result to the device, wherein the device provides a display corresponding to the result of assessing the measured value in accordance with the received result of assessing the measured value and a previously registered display standard, and wherein the host comprises a host terminal connected to the network, and the host terminal displays that the lot is abnormal when the result of assessing the measured value is abnormal while displaying that the lots starts into a next process when the result of assessing the measured value is normal.

8. The system of displaying a measurement result in an inspection process according to claim 7, wherein the device comprises a device monitor, and the device monitor provides the display showing the operating condition of the device and the display corresponding to the result of assessing the measured value.

9. The system of displaying a measurement result in an inspection process according to claim 7, wherein the host does not transmit an instruction to transfer the corresponding lot or transmits an instruction to transfer the lot to a buffer, to a transferring portion connected to the host via the network in case that the result of assessing the measured value is abnormal while transmitting to the transferring portion an instruction to transfer the corresponding lot and also transmitting to a processing device for a next process an instruction to start processing of the corresponding lot in case that the result of assessing the measured value is normal.

10. The system of displaying a measurement result in an inspection process according to claim 7, wherein the device comprises an identification unit for reading a lot number including a bar code, wherein the identification unit reads the lot number and then adds the number to the measured data so as to transmit the data to the host, and wherein the processes management server includes the lot number in the produced result of assessing the measured value.

11. A lot processing system using the system of displaying a measurement result in an inspection process according to claim 7, the system comprising:

a host that controls and manages a device for inspecting a lot in each of a plurality of processes, wherein the host does not transmit an instruction to transfer a corresponding lot or transmits an instruction to transfer the lot to a buffer, to a transferring portion connected to the host via network in case that a result of assessing a measured value of the lot is abnormal while transmitting to the transferring portion an instruction to transfer the corresponding lot and also transmitting to a processing device for a next process an instruction to start processing of the corresponding lot in case that the result of assessing the measured value is normal.

12. A system of displaying a measurement result in an inspection process using a network, the system comprising:

a device that measures a lot based on a measurement condition corresponding to the inspection process so as to obtain measured data; and a host that intensively controls and manages the device in one or a plurality of steps, the host further comprising:

a device control server that transmits to the device via the network the measurement condition of a lot determined to be used; and a process management server that assesses the measured data, which is received via the network, based on a predetermined assessment standard, and then produces a result of assessing a measured value so as to transmit the result to the device, wherein the device provides a display corresponding to the result of assessing the measured value in accordance with the received result of assessing the measured value and a previously registered display standard, wherein the device comprises a four color display unit including a first display portion, a second display portion, a third display portion and a fourth display portion of colors different from each other, and wherein the four color display unit provides a display corresponding to the result of assessing the measured value and a display showing an operating condition of the device operating or not operating, by lighting up, turning off or flashing four color of the four colors display unit.

* * * * *